March 2, 1937. O. K. REINHARDT 2,072,568
DRY CELL ENCASING APPARATUS
Filed July 21, 1933 10 Sheets-Sheet 2

FIG.2.

INVENTOR
OTTO K. REINHARDT
BY
Frederick Griswold Jr.
ATTORNEY

March 2, 1937. O. K. REINHARDT 2,072,568
DRY CELL ENCASING APPARATUS
Filed July 21, 1933 10 Sheets-Sheet 3

FIG.3.

INVENTOR
OTTO K. REINHARDT
BY Frederick Griswold Jr.
ATTORNEY

March 2, 1937.　　　O. K. REINHARDT　　　2,072,568
DRY CELL ENCASING APPARATUS
Filed July 21, 1933　　　10 Sheets-Sheet 6

INVENTOR
OTTO K. REINHARDT
BY
Frederick Griswold
ATTORNEY

March 2, 1937. O. K. REINHARDT 2,072,568
DRY CELL ENCASING APPARATUS
Filed July 21, 1933 10 Sheets-Sheet 8

INVENTOR.
OTTO K. REINHARDT
BY
Frederick Griswold
ATTORNEY

March 2, 1937. O. K. REINHARDT 2,072,568
DRY CELL ENCASING APPARATUS
Filed July 21, 1933 10 Sheets-Sheet 10

Patented Mar. 2, 1937

2,072,568

UNITED STATES PATENT OFFICE

2,072,568

DRY CELL ENCASING APPARATUS

Otto Karl Reinhardt, Jamaica, N. Y., assignor to Bond Electric Corporation, Jersey City, N. J., a corporation of Delaware Application July 21, 1933, Serial No. 681,551

10 Claims. (Cl. 226—2)

This invention relates to machines for automatically inserting dry cells, so-called, into their tubular wrappers.

At the present time, a dry cell generally comprises a metallic cup, forming one of the terminals of the cell. The open mouth of the cup is closed by appropriate material through which projects a central rod-like electrode protruding above the cup rim. To insulate the cell, and for other reasons, the metallic cup-like container is generally surrounded by or wrapped with nonconductive material. With dry cells intended for use in flashlights, hand-lanterns and the like, the bottom of the metallic cup is usually exposed as a cell terminal and the protective insulating casing takes the form of a tubular wrapper of fibrous material, such as paper or paste-board, into which the cell snugly fits. Heretofore, the insertion of the cell into the tubular wrapper, during manufacture, has been by hand.

The primary object of the invention is an automatic machine by which dry cells are inserted within tubular wrappers. To this end, tubular wrappers are advanced through the machine and a cell is inserted in each wrapper.

Another object of the invention is the simultaneous wrapping of more than one cell at a time.

It is also an object of the invention to provide means to deliver the tubular wrappers, and also the dry cells, in groups of two or more, to conveying means.

The invention also seeks automatic devices for properly positioning a plurality of wrappers and/or dry cells for simultaneous insertion in the machine.

A further object of the invention is to facilitate the insertion of a dry cell within a tubular wrapper. To this end, means are provided for flaring the end of the tubular wrapper so that a dry cell may readily find its way therein.

Still another object of the invention is a carrier in a machine of the character described adapted to simultaneously receive a plurality of tubular casings and/or dry cells, as the case may be, and advance the same between a plurality of stations at which operations are performed.

The invention further seeks automatic stop mechanism whereby the progress of the machine is stopped in the event that tubes or cells are not properly positioned therein.

Yet another object of the invention is automatic ejecting means for completed wrapped cells.

The invention also has to do with an automatic machine for inserting dry cells in wrappers which is practical from the standpoint of ease, celerity of operation and convenience in use.

These and other objects of the invention and the means for their attainment will be more apparent from the following detailed description, taken in connection with the accompanying drawings illustrating one embodiment by which the invention may be realized, and in which:—

Figure 1:
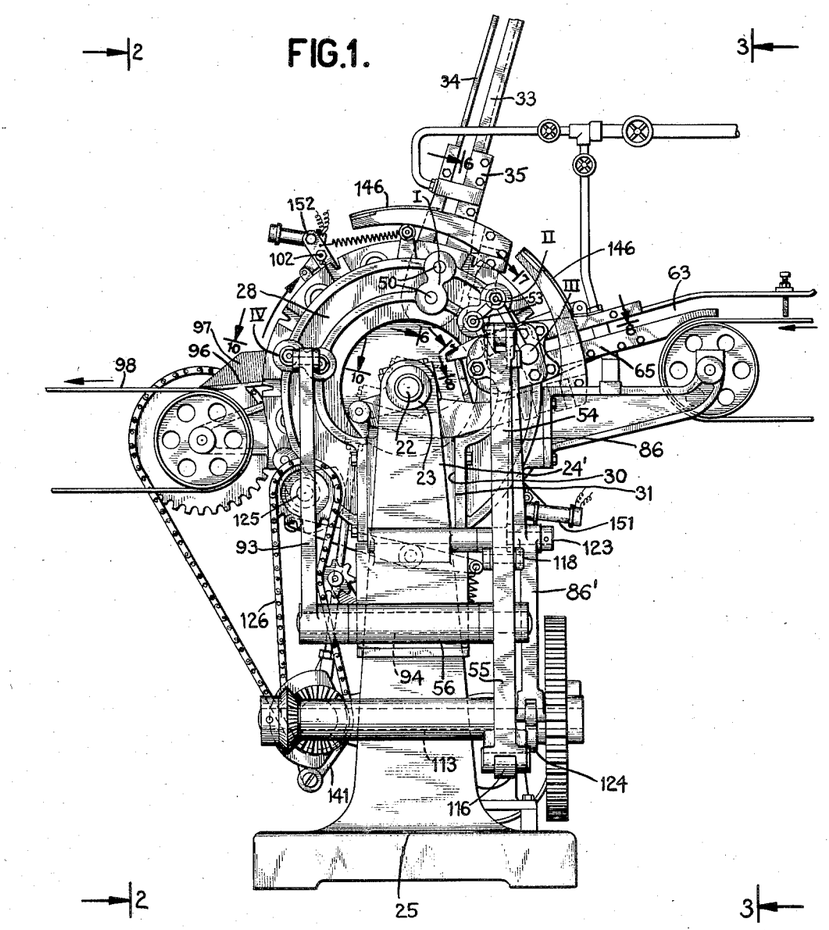
Figure 1 is a view in side elevation, showing the tube applying machine of this invention from what may be considered the front of the machine, the cells being inserted in tubes already in the turret from this side.

In order that the function and operation of the various instrumentalities hereinafter to be described may be readily and clearly understood, the sequence of operations will first be briefly described. Referring to Figure 1, the tubular wrappers, hereinafter referred to as tubes, are first delivered to the machine by chute 33 and inserted at Station I in a plurality of radially and circumferentially arranged receptacles 26 in a turret 24 rotating on a horizontal axis 22. The tubes are delivered to the side of the turret opposite to that viewed in Figure 1.

The turret 24, as illustrated, is formed with two rows or series of groups of radially disposed receptacles 26 (Figure 4) preferably two receptacles as shown, one row near the margin of the circular turret and one row inwardly thereof. Thus pairs of radially disposed receptacles, hereinafter referred to as twin receptacles, are disposed at intervals about the turret. In the illustrated embodiment, twelve such pairs of receptacles are shown. The tubes are then engaged by selecting mechanism and properly positioned in register with the respective receptacles, whereafter they are inserted in the receptacles by plungers moving synchronously with other moving parts of the machine. At this time, the turret is standing still.

By a Geneva movement, the turret 24 is given a step-by-step movement. After a pair of tubes is inserted in a pair of receptacles, the turret is rotated through a predetermined angle to bring the receptacles, in which tubes are already inserted, to a second station, marked II in Figure 1. At this station, the turret stops and the pair of receptacles immediately succeeding those already filled with tubes is at the same time brought opposite the tube chute Station I to receive tubes at the next operation of the machine. On the opposite side of the machine, at Station II, that is, the near side as viewed in Figure 1, are a pair of flaring mandrels 51 which are advanced to flare outwardly the rim of the tube on that side of the machine. These flaring mandrels move synchronously with the tube inserting plungers 48 on the opposite side of the machine, so that while tubes are being inserted at Station I, tubes already inserted at Station II are being flared by the flaring mandrels. After these operations are performed, the turret 24 is moved to bring the flared tubes to Station III, which is opposite the cell chute. While the turret is coming to rest, devices seize the two lowermost cells in the bottom of the chute and properly space them in register with the flared tubes at Station III. The cells are positioned on the near side of the turret, as viewed in Figure 1. Simultaneously, with the movement of the tube inserting plungers at Station I and the flaring mandrels at Station II, cell inserting plungers operate to push the cells into the flared mouths of the tubes at that station. The cased cells are then moved in step-by-step manner to the ejecting Station IV shown at the left in Figure 1, where they are ejected by ejecting plungers located at the near side of the turret, as viewed in Figure 1, and rolled down a chute preferably through a travelling belt carrying them away from the machine.

*Turret*

Figure 2:
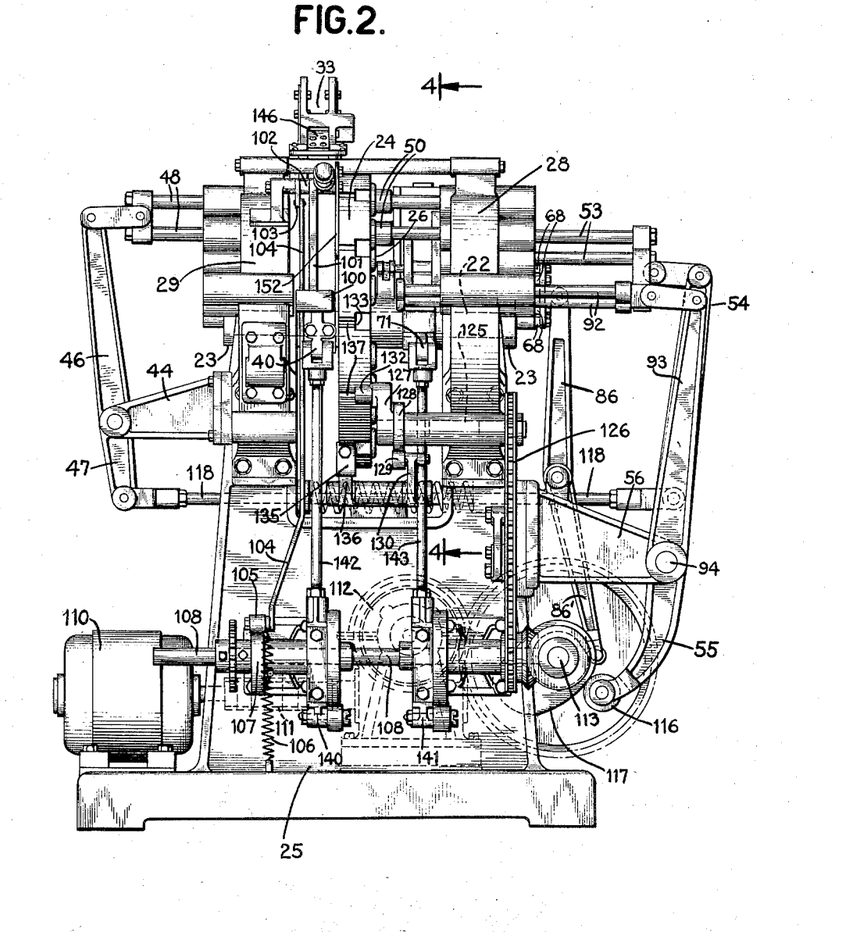
Figure 2 is a view showing the machine in end elevation, looking from the left in Figure 1, i. e., from that end of the machine at which the completed article is ejected and called the ejecting end.
Figure 3:
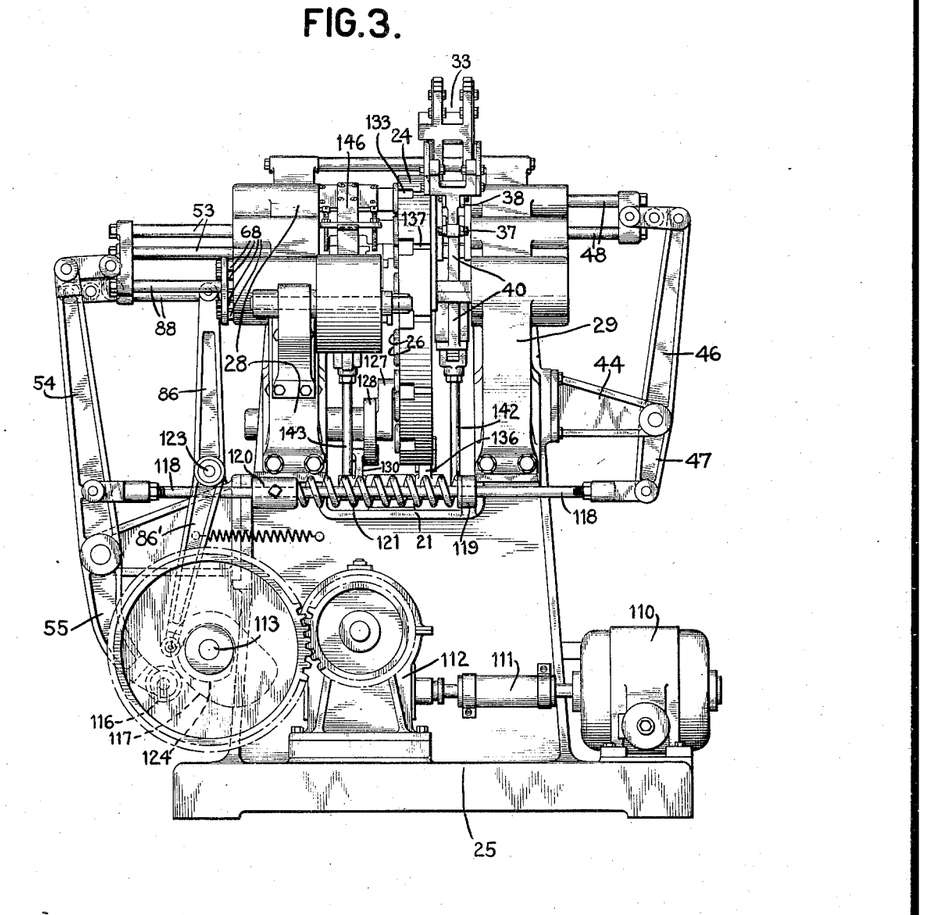
Figure 3 is a view showing the machine in end elevation looking from the right of Figure 1, i. e., that end of the machine to which the cells are delivered for insertion in the tube and called the receiving end.

Referring now to Figures 1, 2 and 3, the turret 24 is mounted upon a freely rotatable turret shaft 22 journalled in bearings 23 disposed in spaced upwardly directed bracket arms 24' arising from the base 25 of the machine.

Figure 6:
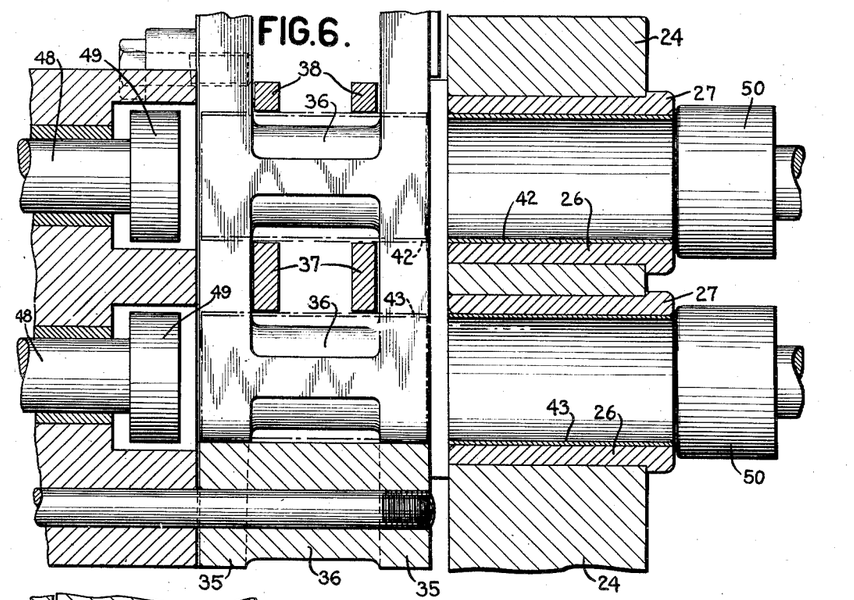
Figure 6 is an enlarged fragmentary sectional view, taken in the plane indicated by the line 6—6 of Figure 1, looking in the direction of the arrows, and showing details of the lower end of the tube delivery chute, the tube spacing means being shown in position to register the tubes with the turret receptacles and the tube inserting plungers.

The turret 24 (Figure 4) is circular and rotates in a vertical plane. It is of substantially disc-like form and is formed with two concentric rows of tubular passages forming receptacles 26 for the tubes and wrapped dry cells, corresponding receptacles 26 in the respective rows lying on radii of the machine. In the illustrated embodiment, twelve groups or pairs of receptacles are shown. To form the receptacles, tubular bushings 26 are inserted in the cylindrical hole in the turret, as shown in Figure 6, these bushings being collared at one side to position them and facilitate insertion and removal. The bushings 26 thus form the receptacles and are of an interior diameter to snugly receive the tubular wrapping.

On the front side of the turret 24 is an annular front frame 28 and on the rear side, an annular rear frame 29. These frames 28, 29 are substantially in the plane of the bracket arms 24' and are cut away as at 30 and bolted at that point to surfaces 31 formed on the arms 24'. The front frame 28 supports the bearings for flaring and cell inserting and ejecting plungers, while tube inserting plungers slide in bearings in the rear frame 29.

*Station I—Tube delivery*

Figure 4:
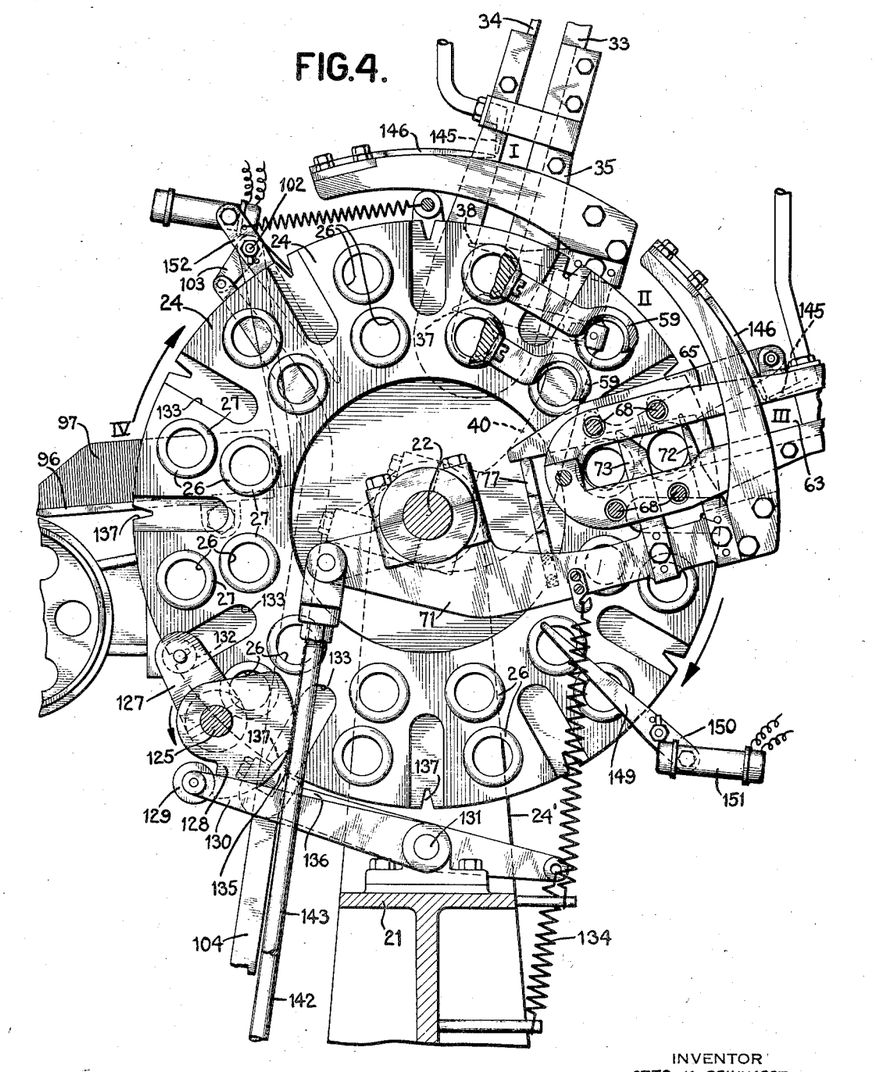
Figure 4 is an enlarged view showing the turret looking from the front, as in Figure 1, and taken on the plane indicated by the line 4—4 of Figure 2, with the side frame and plunger mechanism removed in the interest of clearness.
Figure 5:
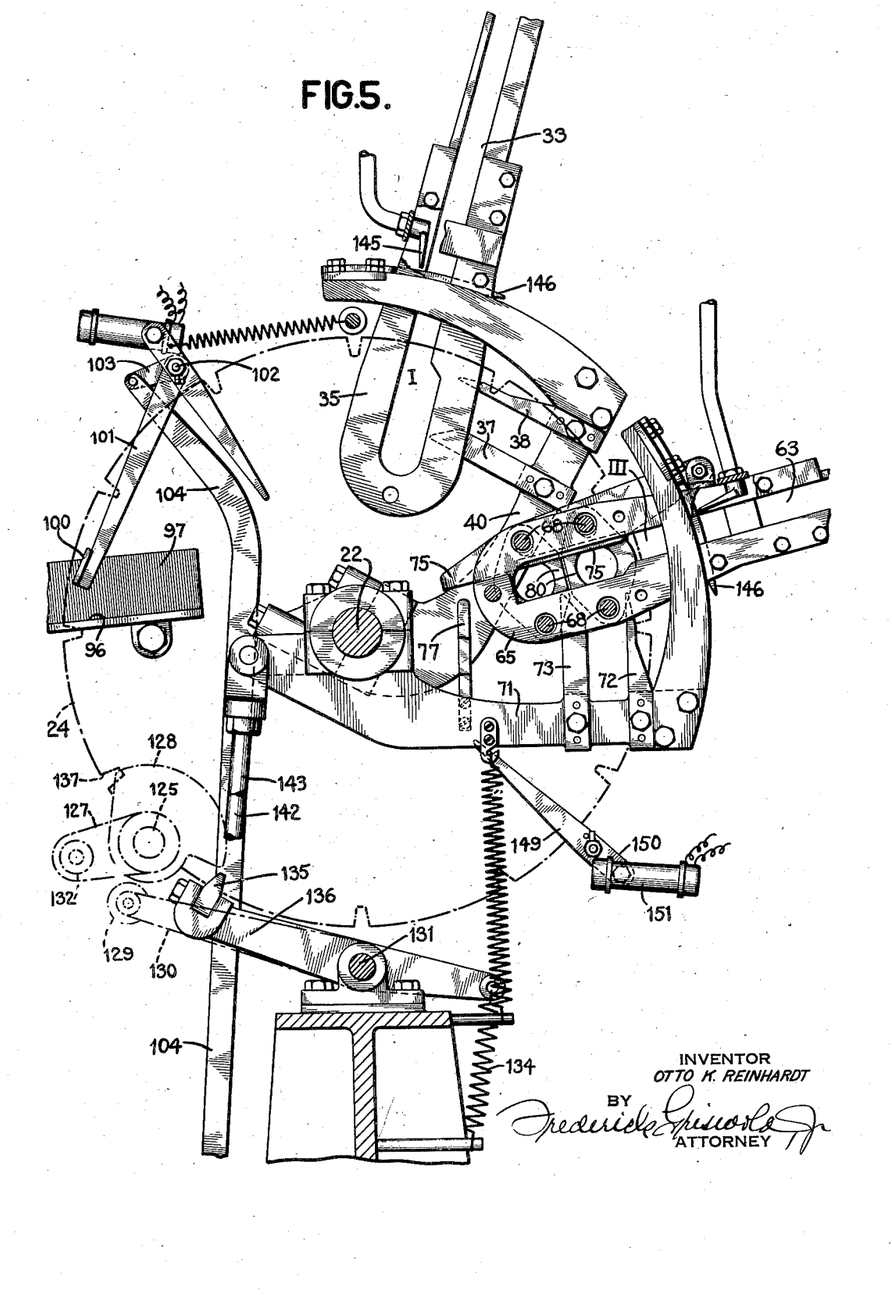
Figure 5 is a view of certain of the parts illustrated in the same position as in Figure 4, but with the turret removed in the interest of clearness, and showing particularly the tube delivery and tube spacing mechanism and the ejecting mechanism in the position assumed when two wrapper tubes or two cells are dropped from the delivery chute for positioning in the receptacles in the turret.
Figures 11, 12, 13:
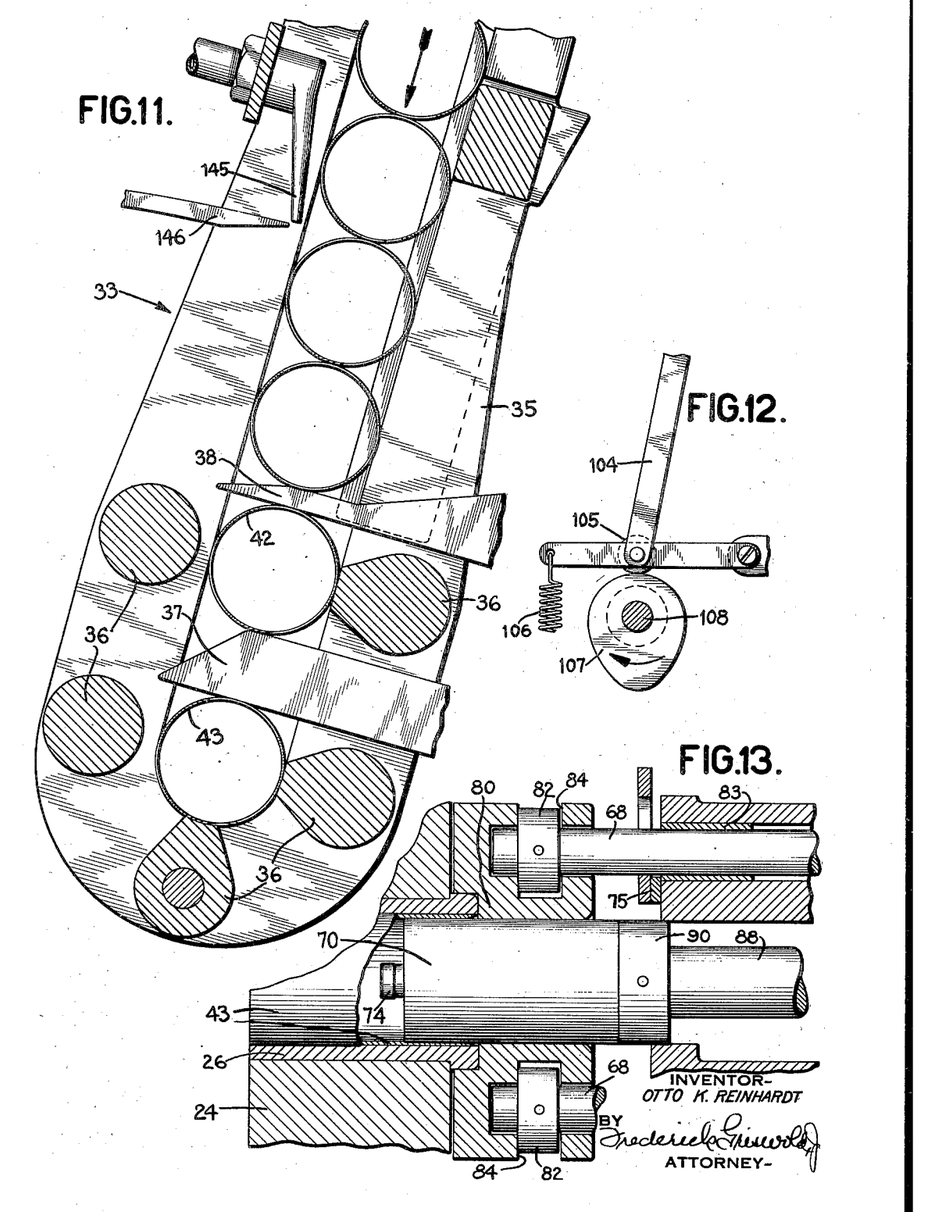
Figure 11 is a fragmentary sectional view showing details of the tube chute and the manner in which two tubes are registered with twin receptacles in the turret.
Figure 12 is a detail view showing the cam which actuates the mechanism adapted to prevent an accumulation of cells on the chute.
Figure 13 is a fragmentary sectional view showing a cell being inserted in a tube in the turret.

A tube chute or runway 33 is illustrated in Figures 1 and 4 as extending downwardly at a slight inclination and terminating proximate the side of the turret at the upper portion thereof opposite the place where one pair of cell receptacles comes to rest in the step-by-step movement of the turret 24. This chute may be supported in any convenient way. The tubes roll down this chute and rest one on top of another at the bottom, as shown in Figure 11. The location of the tube chute is referred to as Station I. While the turret is in movement to Station I, tube centering and registering members, illustrated in Figure 5, are brought into operation.

The chute 33 may be of any convenient kind so long as it provides a surface over which the tubes may roll with side wall portions to prevent two tubes leaving the track. Preferably also the track is provided with top bars 34 so that the cells cannot be forced up out of line.

At the bottom or end of the chute 33, 34 is a tube receiving member (Figure 11) comprising, in the illustrated embodiment, two spaced U-shaped plates 35 secured at their upper or outer ends to the sides of the chute 33, 34. These plates may form track and side portions as parts of a casting having integral spacing portions 36 spaced from one another to permit the passage of tube spacing and centering members comprising a pair of wide centering blades 37 and a pair of narrower retaining blades 38. The tube spacing and centering members 37, 38 are carried on an arm 40 rotatably mounted on the horizontal turret shaft 22 between the turret and the plunger frame and movable through a relatively small angle of oscillation. The same type of receiving member 35 and spacing and centering device is used to position the cells at Station III, Figures 6 and 14, as will be brought out more fully hereafter and the same reference characters are applied to the same structure in these figures.

At the outer end of this arm 40 is mounted, one on each side, the tube retaining blades 38 (Figures 5 and 6) which have tapered ends and are adapted to be inserted as a pair between the next to the lowermost cylindrical member 42 and the ones immediately thereabove to hold the stack of cylindrical members upwardly away from the bottom of the chute. Below this retaining blade, is the pair of centering or spacing blades 37 of a width sufficient to properly space the tube 42 and the lowermost cylindrical member 43 to center them for insertion in the twin receptacles. This blade 37 also has a tapering end to facilitate its insertion between the lowermost and the next to the lowermost cylindrical members. It retains the lowermost cylindrical member in the bottom of the end member 35 and raises the next to the lowermost cylindrical member to a position where it is in register with the outermost receptacle of the turret and holds it firmly against the retaining blade 38 so that both cylindrical members are properly positioned.

Projecting rearwardly from the rear frame 29 (Figures 2 and 3) is a bracket 44 on which is mounted a rocking lever 46, 47, the upper end 46 of which is connected to a pair of tube inserting plungers 48 shown in greater detail in Figure 6. These plungers are slidable in bearings in the rear frame 29 and have, each, an enlarged disc-like head 49, of a diameter slightly larger than the tubes 42, 43 to be advanced from the chute member 35, 36, into the receptacle 26 in the turret 24. When the lever 46, 47, Figure 2, is rocked in a clockwise direction, the plungers 48 move to the right, as viewed in Figure 6, and engage the ends of the tubes positioned in the bottom of the chute and push them into the receptacles 26 in the turret 24, in which they are properly positioned by means of tube stops 50 disc-like in form suitably supported from the front plunger frame 28 to be always in position in register with the tube receptacles at Station I.

Station II

Figure 7:
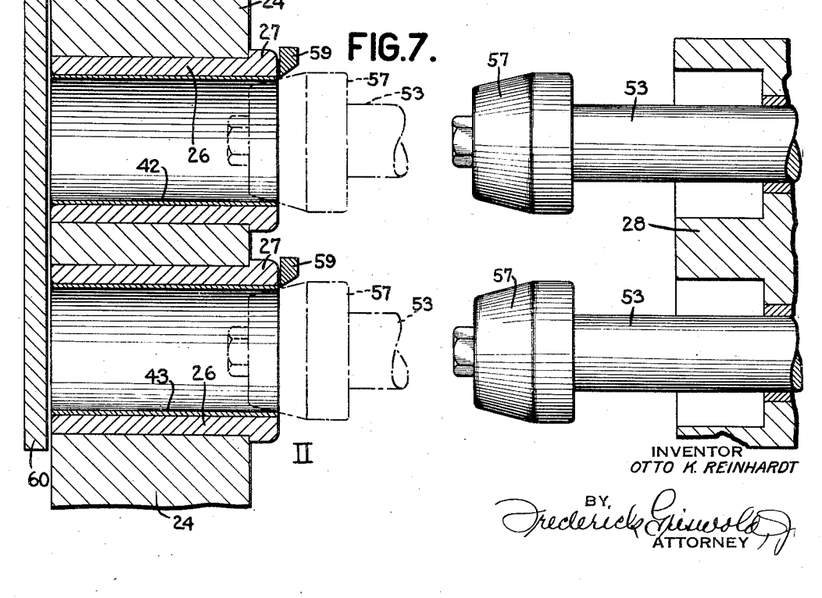
Figure 7 is a fragmentary sectional view, taken on the line 7—7 of Figure 1 and showing a pair of tubes in the turret at the second Station II of the machine and the male die members used to flare the ends of the tubes to facilitate insertion of the cells.

The Geneva mechanism then moves the turret one step so that the receptacles with tubes just inserted therein, are brought to Station II. The next following receptacles are then, of course, at Station I. On the front side of the turret, as viewed in Figure 1, i. e., the right hand side, as viewed in Figure 2, are a pair of flaring plungers 53 slidable in the front plunger frame 28 and operatively connected by a link with the upper end 54 of a rocking lever 54, 55 pivoted on a bracket 56 extending outwardly from the base 25 of the machine and actuated in a manner hereinafter to be described. These flaring plungers, Figure 7, have frusto-conical heads 57 mounted on their ends. The smaller and forward end of the plunger is of a diameter less than the diameter of the tube so that it will enter the tube in a turret receptacle and will flare outwardly or bevel on the inside, the edge of the tube at this end, as shown, for instance, at 58 in Figure 8.

To overcome any tendency of the mandrel to withdraw a tube from the receptacle as it is retracted, stop blades 59 are provided disposed in close proximity to the end of the receptacle bushing and overlying the edge of the tube so as to hold the tube within the receptacle as the mandrel 57 is withdrawn. At this station, also, on the opposite side of the turret 24 is a stop plate 60 also disposed in close proximity to the rear end of the receptacles which prevents the tubes from being forced out of the receptacles rearwardly as the flaring mandrels 57 enter.

The operation of flaring the tubes 42, 43 at Station II, takes place simultaneously with the insertion of another pair of tubes at Station I. Thereupon is the Geneva mechanism again actuated to rotate the turret another step to bring the flared tubes opposite Station III and the cell chute, thereby at the same time bringing another set of tubes opposite Station II for the flaring operation and another pair of empty receptacles opposite the tube chute to receive a fresh supply of tubes.

Station III

Figure 8:
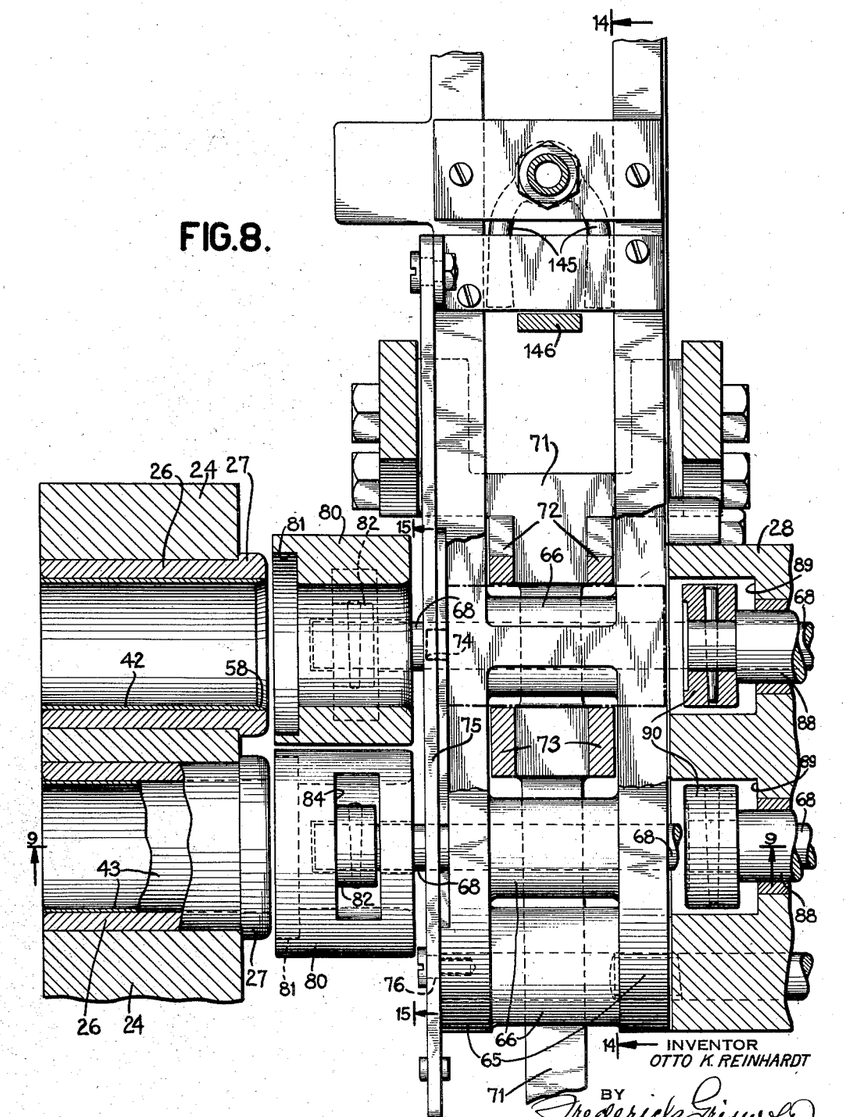
Figure 8 is a fragmentary sectional view, taken on the line 8—8 of Figure 1, and showing the position of tubes in the turret at Station III to receive cells delivered by the cell chute and the cell inserting plungers in retracted position, self-aligning bushings being shown between the turret and the cell chute.

Referring now to Figures 3, 5 and 8, it will be observed that the cell chute 63 is disposed upon the opposite side of the turret 20 from the tube chute 33, that is, upon the front or near side of the turret, as viewed in Figure 1.

A cell receiving head substantially the same as the tube receiving head 35, 36 is mounted on the end of the cell chute 63 proximate the turret at Station III, and comprises cast U shaped side plates 65 integral with transverse spacing members 66. However, in this instance, the spacing members 66 are formed with passages 67 for operating rods 68 for floating bushings hereinafter to be described.

Figures 14, 15:
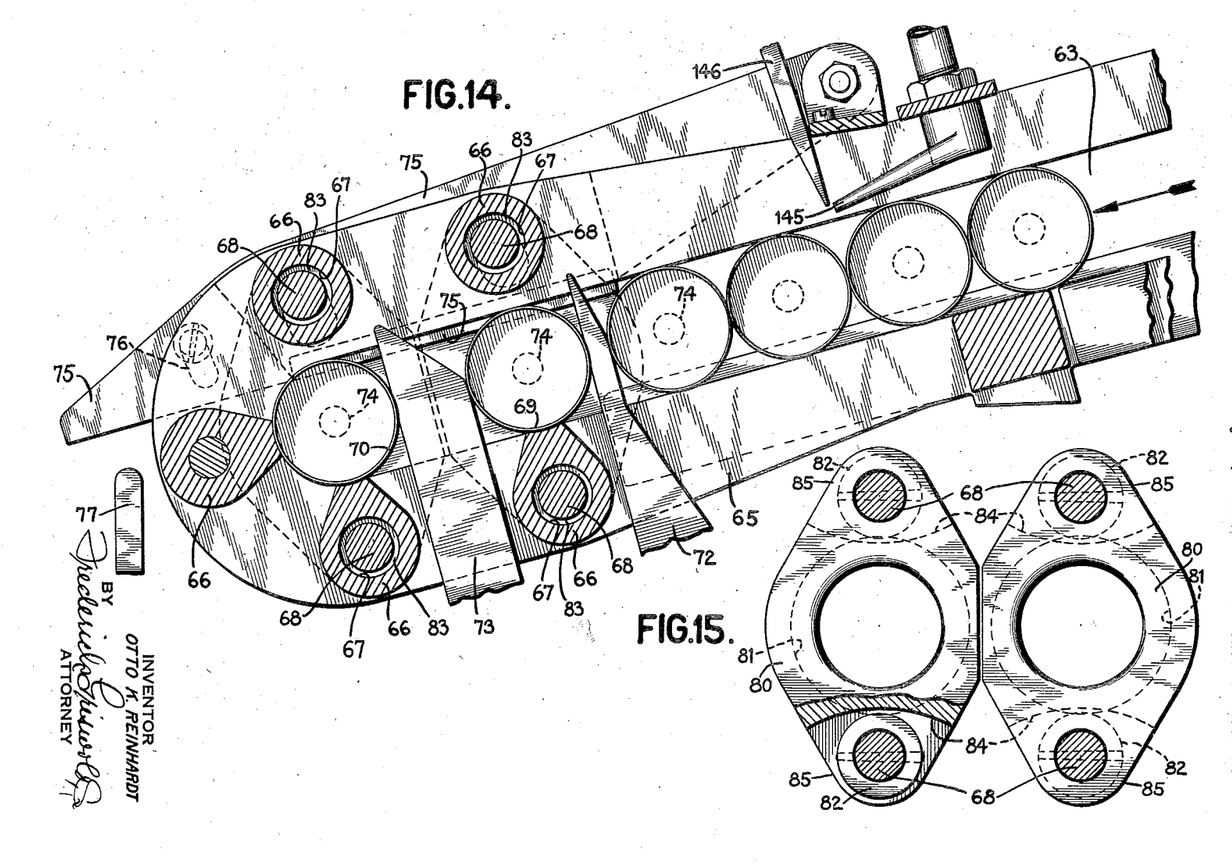
Figure 14 is a sectional view taken in the plane indicated by the line 14—14 of Figure 8 and showing the cell chute and the cell spacing mechanism, which is similar in its operation to the mechanism illustrated in Figure 11.
Figure 15 is a detail sectional view taken in the plane indicated by the line 15—15 of Figure 8 and showing the self-aligning bushings in end elevation.

The two lowermost cells 69, 70 are again similarly positioned and spaced by mechanism operating, preferably, in exactly the same manner as that already described in connection with the tube spacing devices. An arm 71 is, therefore, pivotally mounted upon the horizontal turret shaft 22 on the front side of the turret 24, and this arm has at proximate its extremity a cell retaining blade 72 and inwardly thereof toward the axis of rotation of the turret, a cell spacing blade 73. As before, these blades are tapered or pointed so as to facilitate their insertion between adjacent cells. These blades function as described in connection with the similar blades 37 and 38. While the turret is moving to Station III, the arm is actuated to bring the spacing and positioning blades between the lowermost cell 70 and the next to the lowermost cell 69 and between that cell 69 and the stack of cells therebehind. As shown in Figure 14, the spacing blade 73 thus holds the lowermost cell against the lowermost end of the chute exactly in register or axial alignment with that innermost receptacle 26 in the turret at Station III and positions the next to the lowermost cell 69 in axial alignment with that outermost receptacle at Station III. The retaining blade 72 also holds the cell 69 against the spacing blade 73.

In order that the cells may be properly aligned in the cell chute 63 whereby their central electrodes 74 do not project too far and interfere with the operation of the machine, a cell end aligning blade 75 is pivotally mounted on the chute end 65 and permitted limited movement into and out of position to contact with the edge of the cells by a pin and slot connection 76. After the cells are properly positioned, a trip arm 77 on the rocking arm 71 displaces the blade 75 to permit the cells to be advanced.

When the turret comes to rest at Station III, cell advancing mechanism is brought into play.

Figure 9:
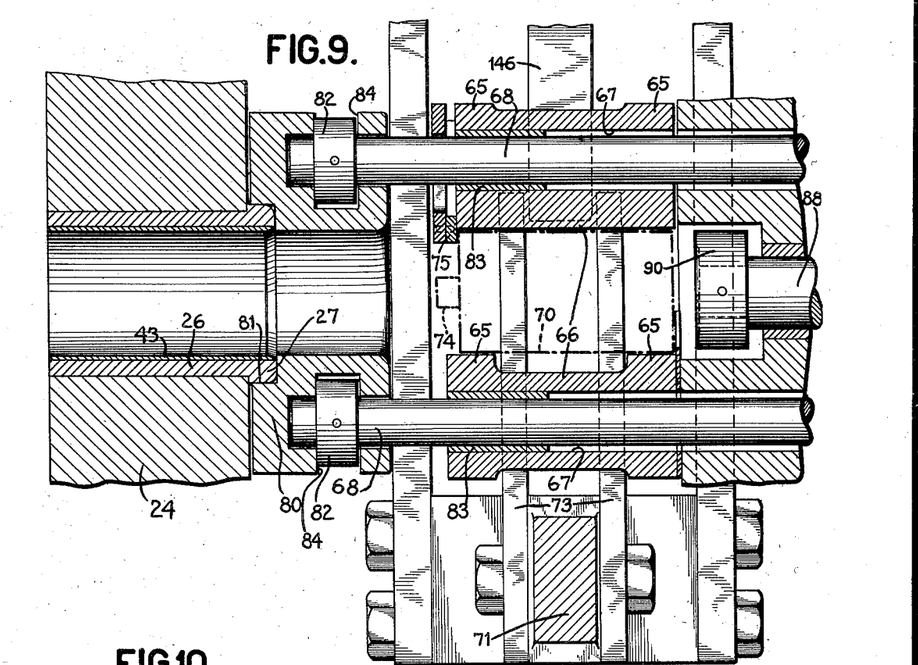
Figure 9 is a fragmentary sectional view taken in the plane transverse to that shown in Figure 8, and on the line 9—9 of that figure and showing one of the self-aligning bushings of Figure 8 in operative position.

Referring now to Figures 8 and 9, it will be observed that floating centralizing bushings 80 are disposed between the turret 24 and the cell chute receiving head 65. These bushings have an interior diameter just sufficient to permit the cell to pass freely therethrough while on the side next to the turret, the passage is of increased diameter, as at 81, to receive the flange 27 on the receptacle 26, as shown in Figure 9. After the turret 24 comes to rest, the centralizing bushings 80 are advanced from the position shown in Figure 8 to the position shown in Figure 9 by actuating rods 68 passing freely through bearing members 83 disposed within the holes 67 in the transverse members 66 on end member 65 thereof. These rods have at their extremities, collars 82, which fit within recesses 84 formed in the extended sides 85 of the bushings 80, (Figure 15). The rods 68 slide through the front flange frame 28 and are connected at their extremities to the end 86 of a cam actuated lever 86, 86' pivotally mounted as hereinafter to be described more in detail on the front of the frame of the machine.

After the centralizing bushings 80 are in position, cell advancing plungers advance through the chute and push the cells through the bushings into the tubes. These cell inserting plungers take the form of rods 88 slidable in the front plunger frame at Station III. On the side adjacent the cell chute end 65, the front plunger frame is formed with recesses 89 which receive the cell engaging heads 90 on the plungers 88. These heads are cylindrical and preferably pinned upon a reduced end of the rod and abut against a shoulder formed thereby. On the side facing the cell chute, the heads are preferably recessed slightly with a circular recess or depression to conform to the bottom of the cells.

Here again, the receptacles 26 in the turret 24 are backed up by a continuation of the stop plate 60, hereinbefore described, to prevent the cells, during insertion, forcing the tubes 42, 43 out of the receptacle to the rear and this plate also restrains the cells from projecting beyond the rear face of the turret.

Station IV

The turret is advanced by a step-by-step movement and when the turret is at rest, while the cells are being inserted in the receptacle at Station III, subsequent tubes at Station II are being flared and tubes are being inserted at Station I. The step-by-step rotation of the turret continues carrying the encased tubes from Station III downwardly and around to Station IV where the cells are ejected.

Figure 10:
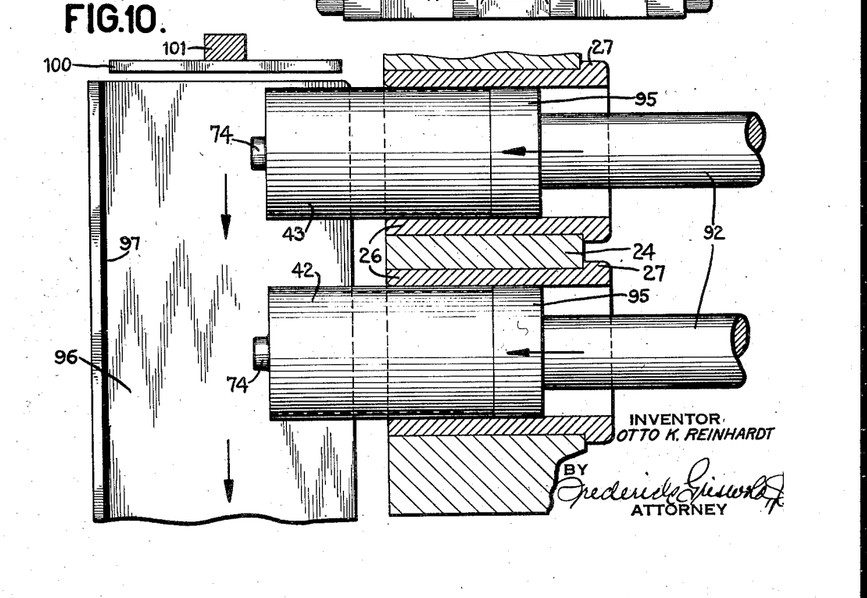
Figure 10 is a fragmentary sectional view taken on the line indicated on the line 10—10 of Figure 1 and showing the ejecting mechanism for wrapped cells.

The ejector plungers 92 are slidable in the front frame and are connected with the upper end of an arm 93 pivotally mounted on a transverse shaft 94 journalled in the aforesaid bracket 56. This arm 93 moves synchronously with the lever 54, 55 operating the flaring mandrels since both are fixed on the same transverse shaft 94. The ejecting plungers comprise rods 92 having enlarged heads 95 at their ends pinned in substantially the same manner as that hereinbefore described in connection with the cell inserting plungers. The diameter of the head, of course, is substantially equal to the outside diameter of the tubes 42, 43 so that they will enter the receptacles 26 and push the encased dry cells before them out of the turret 24 and onto an inclined chute 96 disposed on the rear side of the turret, as viewed in Figure 5. This chute 96, as shown in Figure 10, has an insulated wall 97 at its side remote from the turret against which the cells abut and the cells then roll down this incline for delivery from the machine, say, onto the travelling belt 98, illustrated in Figure 1.

Cell sweep

To prevent the cells collecting on the inclined runway and jamming the machine, there is mounted a cell sweep 100, 101 (Figure 5). This cell sweep consists of a plate 100 conveniently of substantially rectangular shape adapted to move over the face of the incline and carried on the end of an arm 101 pivotally mounted on a rock shaft 102 journalled on a bracket on the rear side of the machine. This shaft 102 has fixed thereon another arm 103 which is connected to an upwardly extending pushrod 104 having at its lower end a roller 105 held downwardly by means of a tension spring 106 against an actuating cam 107 on the cam shaft 108. Thus, at each dwell of the cam 107, the upward movement of the push rod caused thereby oscillates the sweep 100, in a direction to push the cells down the incline during the clockwise sweep.

Operating mechanism

While any source of power may be provided for the mechanism in accordance with this invention, there is illustrated an electric motor 110 mounted upon the base 25 of the machine and adapted to drive, through a flexible coupling 111, speed changing gearing 112, and a cycle shaft 113 which extends across the front of the machine. This cycle shaft 113 also drives a cam shaft 108 extending along the ejecting end of the machine which actuates certain of the mechanisms. The cam shaft is shown in greater detail in Figure 2. On the side of the base 25 of the machine and extending forwardly, is the bracket 56 formed at its outer end with a journal for the rock shaft 94 and fixed on this rock shaft 94 on the delivery end of the machine, is the lever 54, 55, the upper end 54 of which has connected thereto the flaring mandrel plungers 53 and the cell inserting plungers 88. At its lower end 55, the lever carries a roller 116 normally held in engagement with a cam 117 on the cycle shaft 113. Connected to the lever 54, 55 above its fulcrum is a horizontally extending connecting rod 118 in Figure 3, which is journalled in a bearing 119 carried on the base 25 and connected at its other end to the lever 46, 47 actuating the tube inserting plungers 48. This operating or connecting rod 118 carries an adjustable collar 120 and a heavy coil spring 121 is disposed between the collar 120 and the bearing 119 normally urging the rod 118 to the left, as shown in Figure 3, to hold the roller 116 against the cam 117 and normally tend to withdraw the flaring and cell inserting plungers, as well as the tube inserting plunger 48. The cam 117 carried on the cycle shaft 113 is so proportioned and shaped that upon each revolution of the cycle shaft 113 the flaring mandrels and cell and tube inserting plungers are moved inwardly to perform their function.

At the ejecting end of the rock shaft 94 (Figure 2) is mounted an arm 93 connected at its upper end to the cell ejecting plungers 92 so that each movement of the cam actuated lever 55 effects simultaneous and appropriate movement of all the plungers.

The rods 68 which move the centralizing bushings 80 are also actuated from the cycle shaft 113. The lever 86, 86' is fulcrumed on a spindle 123 mounted on the delivery end of the frame near the front and is rocked thereabout in proper timed relation to the rock shaft 94 by a cam 124 on the cycle shaft 113.

To effect the indexing or step-by-step movement of the turret 24, intermittent gearing is provided. There is shown, at the ejecting end on the front plunger frame, a Geneva shaft 125 which is constantly rotated at the desired speed by a drive chain 126 passing over sprockets of suitable ratio on the cam shaft 108 and on the Geneva shaft 125. A suitably proportioned driver 127 is mounted on the Geneva shaft 125 on which is also a locking cam 128 adapted to be engaged by a roller 129 on the end of the timing lever 130 fixed on a shaft 131 journalled in a bearing carried by saddle 21 of the frame. The driver rotates in the direction indicated by the arrows in Figure 4. The driver has at its end a driving roller 132 adapted to engage in the radial recesses 133 disposed between adjacent pairs of receptacles 26 in the turret 24. Thus, as the shaft 125 revolves, the arm is rotated therewith and the roller is brought into one of the radial recesses 133, as, when given twin receptacles, are at Station I, and as the arm moves in a counter-clockwise direction (Figure 4), it rotates the turret and moves the twin receptacles, say, to Station II where the roller 132 leaves the recess 133. At this time, the roller 129 on the timing arm 130 falls off the high spot of the locking cam 128 onto the low spot, as shown in Figure 4, and permits the spring 134 at the opposite end of the lever 130 to rock the shaft in a clockwise direction to bring the locking lug 135 on the arm 136 also fixed on the shaft 131 upwardly into the locking recess 137 formed in the turret, thereby holding the turret stationary in that position for the necessary operation.

The cam shaft 108 also carries cranks 140, 141, and upwardly extending pitmen 142, 143 connected to the respective cell and tube spacing and positioning arms 40, 71 whereby at appropriate intervals of time, these arms are rocked about the turret shaft as hereinbefore described.

While both the tube chute 33 and the cell chute 63 are inclined so that the tubes and cells respectively tend to roll downwardly to the bottom or delivery position, provision is made for urging these cylindrical objects to the bottom of the chute. This is conveniently accomplished by a blast of air. Journalled in one side of the chute, in each instance, is a U-shaped nozzle 145 having two spaced mouths directed downwardly toward the delivery end of the chute. This nozzle 145 is in communication with an air conduit of some convenient kind leading from a source of air under pressure. Air escapes from the nozzle in a jet which strikes a cylindrical object and urges it down the chute. As shown in Figure 5, when the positioning members 37, 38 and 72, 73 are retracted, blades 146 (Figure 14) carried by the scythe-like end 147 of the rocking arms 40 and 71, are inserted between cylindrical objects, thus holding back the stack above the air cut-off blades while permitting the blasts of air to blow two objects down toward the bottom of the chute.

*Safety mechanism*

Safety mechanism is also provided which will stop the operation of the apparatus if cells are improperly positioned in the turret receptacles. As shown in Figures 4 and 5, at an intermediate point between Station III and the ejecting station, a safety arm 149, 150 is disposed which is pivoted intermediate its ends, as on a rock shaft, and the free and longer arm 149 of the lever extends in close proximity to the end of the receptacles but just outwardly of their end. The other end 150 of the lever carries, conveniently, a mercury switch 151, the contacts of which are in the circuit of the prime mover or other power stopping device. Thus, if the end of a cell protrudes beyond the receptacle, it strikes the free end 149 of the lever and, rocking it, tilts the mercury switch to open the contacts and interrupt the circuit. Normally the weight of the mercury switch holds the lever in the position illustrated in Figure 4. A similar lever 152 is provided at that cycle of the turret movement between the ejecting Station IV and Station I, so that if a cell is not ejected and still remains in the receptacle after it passes the ejecting station, the protruding central electrode thereof will strike the arm and tilt the mercury switch to open the circuit and likewise stop the operation of the machine.

It will thus be seen that an automatic machine has been provided to which dry cells and tubular wrappers therefor may be fed in a continuous stream. A plurality of cells at each operation is selected from this stream of oncoming tubular bodies and positioned for insertion into receptacles in a conveyor moving in a step-by-step manner between a plurality of stations and the completely encased cells are ejected at the end of the cycle of operation which are performed seriatim at the different stations in rapid succession.

Various modifications will occur to those skilled in the art in the means for conveying the tubes seriatim through the machine as well as in the number of tube receiving devices in the carrier and the type of operation performed thereon as well as the particular form taken by the mechanisms operating at each station, and no limitation is intended by the phraseology of the foregoing description or illustrations in the accompanying drawings.

What is claimed is:—

1. In a machine for encasing electrolytic cells, in combination, conveying means, means to move said conveying means in a step-by-step movement between a plurality of stations, means to deliver at least one tube to the conveying means at one station, means to flare an end of a tube at another station, means to deliver at least one cell into a tube carried by said conveying means at another station and means to eject the encased cells from the conveying means at another station.

2. In a machine for encasing electrolytic cells, in combination, conveying means, tube receiving means carried therewith, means to move said conveying means in a step-by-step movement between a plurality of stations, chute means to deliver a plurality of tubes to the conveying means at a first station, means at the first station to select from the chute and insert a tube in each tube receiving means at a first station, a tube stop at said first station to position a tube in the conveying means, chute means to deliver a plurality of electrolytic cells to said conveying means at a second station, means at the second station to select from the chute and insert a cell in each tube carried in a receiving means, means at the second station to restrain a tube during insertion of a cell and means to eject the encased cells from the conveying means at a third station.

3. In a machine for encasing electrolytic cells, in combination, a rotary turret formed with tube receptacles, means to give said turret a step-by-step movement between a plurality of stations, means to deliver a plurality of tubes adjacent the turret, means to select and insert tubes in the receptacles at one station, means to flare an end of a tube in a receptacle at a second station, means to deliver a plurality of electrolytic cells adjacent said conveying means at a third station, means to select and insert a cell in a tube in a receptacle and means to eject the encased cells from the turret at a fourth station.

4. Selecting and positioning means for tubular bodies, the combination with a chute adapted to deliver a succession of tubular bodies to a point of ejectment, means to receive one tubular body at the extremity of said delivery means, means adapted to be inserted between a tubular body at said extremity and an adjacent tubular body to retain the first tubular body in position and space the second tubular body a predetermined distance therefrom, and means insertable between the second tubular body and a succeeding tubular body to hold back the successive tubular bodies and retain the second tubular body in position.

5. Selecting and positioning means for tubular bodies, the combination with a chute adapted to deliver a succession of tubular bodies to a point of ejectment, means to receive one tubular body at the extremity of said delivery means, means adapted to be inserted between a tubular body at said extremity and an adjacent tubular body to retain the first tubular body in position and space the second tubular body a predetermined distance therefrom, means insertable between the second tubular body and a succeeding tubular body to hold back the successive tubular bodies and retain the second tubular body in position and means movable between the fourth and fifth tubular bodies in the succession as the said insertable means are withdrawn to permit the third and fourth tubular bodies to be moved to the end of the delivery means.

6. Selecting and positioning means for tubular bodies, the combination with a chute adapted to deliver a succession of tubular bodies to a point of ejectment, means to receive one tubular body at the extremity of said delivery means, means adapted to be inserted between a tubular body at said extremity and an adjacent tubular body to retain the first tubular body in position and space the second tubular body a predetermined distance therefrom, means insertable between the second tubular body and a succeeding tubular body to hold back the successive tubular bodies and retain the second tubular body in position, means movable between the fourth and fifth tubular bodies in the succession as the said insertable means are withdrawn to permit the third and fourth tubular bodies to be moved to the end of the delivery means and means to direct a jet of air against said fourth tubular body to move it to the end of the delivery means.

7. In a machine for encasing electrolytic cells, the combination with a cell delivery chute and a conveyor having receptacles permanently fixed thereon to receive cell casings, of a floating centralizing bushing movable into interlocking engagement with a receptacle and with the inner walls of the bushing in substantial alignment with the inner wall of a cell casing within a receptacle to form a positive guide for a cell and disposed between the cell delivery chute and said conveying means.

8. In a machine for encasing electrolytic cells, in combination, a frame having two spaced upwardly extending bearing frame members, a shaft journalled therein, a turret rotatably mounted on the shaft and having receptacles, intermittent gearing to rotate the turret, levers pivotally carried by the frame, plungers adapted to register with receptacles and slidably mounted in the bearing frame members and connected at their outer ends to the levers, respectively, a tube delivery chute opposite certain of said plungers, a cell delivery chute opposite other of said plungers, an incline to receive ejected cells opposite other of said plungers and means to actuate the plungers simultaneously.

9. In a machine for encasing electrolytic cells, in combination, a base having two spaced upwardly extending frame members, a shaft journalled in said frame members, a turret rotatably mounted on the shaft and formed with twin receptacles, intermittent gearing to rotate the turret between stations, levers pivotally mounted on the base, a tube delivery chute at a first station on one side of the turret, a pair of tube delivery plungers slidably mounted in a frame and reciprocating through the chute member and connected at their outer ends to a lever, a pair of tube flaring plungers on the opposite side of the turret at a second station and slidably mounted in the other frame and connected at their outer ends to a lever, a cell delivery chute on the last named side of the turret, a pair of tube inserting plungers at a third station and slidably mounted in the last named frame and reciprocating through the cell chute and connected at their outer ends to a lever, a pair of ejecting levers at a fourth station slidably mounted in the last named frame member and connected at their outer ends with a lever and means to actuate the levers simultaneously.

10. In a machine for encasing electrolytic cells, the combination with a cell delivery chute and a conveyor having receptacles permanently fixed thereon to receive cell casings, of a floating centralizing bushing provided with a peripheral recess to receive the end of a receptacle movable into interlocking engagement with a receptacle to form a positive guide for a cell and disposed between the cell delivery chute and said conveying means.

OTTO KARL REINHARDT.

CERTIFICATE OF CORRECTION.

Patent No. 2,072,568.   March 2, 1937.

OTTO KARL REINHARDT.

It is hereby certified that error appears in the printed specification of the above numbered patent requiring correction as follows: Page 6, second column, line 26, claim 8, after the word "plungers" insert at different angularly related points with respect to the turret axis; and that the said Letters Patent should be read with this correction therein that the same may conform to the record of the case in the Patent Office.

Signed and sealed this 25th day of May, A. D. 1937.

(Seal)   Henry Van Arsdale
Acting Commissioner of Patents.